United States Patent
Rock (10) Patent No.: US 10,478,372 B1
(45) Date of Patent: Nov. 19, 2019

(54) MOTORCYCLE SEAT MASSAGE SYSTEM

(71) Applicant: Albert John Rock, Lantana, FL (US)

(72) Inventor: Albert John Rock, Lantana, FL (US)

( * ) Notice: Subject to any disclaimer, the term of this patent is extended or adjusted under 35 U.S.C. 154(b) by 985 days.

(21) Appl. No.: 14/582,479

(22) Filed: Dec. 24, 2014

Related U.S. Application Data (60) Provisional application No. 61/920,566, filed on Dec. 24, 2013.

(51) Int. Cl.
*A61H 15/00* (2006.01)

(52) U.S. Cl.
CPC ......... *A61H 15/00* (2013.01); *A61H 15/0078* (2013.01); *A61H 2015/0042* (2013.01); *A61H 2201/0134* (2013.01); *A61H 2201/0149* (2013.01); *A61H 2201/1669* (2013.01)

(58) Field of Classification Search
CPC ...... A61H 2205/081; A61H 2201/0149; A61H 15/00; A61H 2015/0007; A61H 2015/0042; A61H 2015/0078; A61H 7/004; A61H 7/007; A61H 23/006; A61H 2007/009
USPC .............................................. 297/195.1, 243
See application file for complete search history.

(56) References Cited

U.S. PATENT DOCUMENTS

| | | |
|---|---|---|
| 3,037,499 A | 6/1962 | Cummins |
| 4,748,972 A | 6/1988 | Hasegawa |
| 5,020,517 A | 6/1991 | Foster, Jr. et al. |
| 5,027,795 A | 7/1991 | Kato |
| 5,429,585 A | 7/1995 | Liang |
| 6,068,339 A * | 5/2000 | Linzalone ............. B60N 2/448 297/463.1 |
| 6,224,081 B1 | 5/2001 | Wayman |
| 6,849,054 B1 * | 2/2005 | Kim ....................... A61H 7/004 601/100 |
| 7,311,681 B1 * | 12/2007 | Vaccarella ..................... 601/46 |
| 7,322,946 B2 * | 1/2008 | Lev .................... A61H 15/0078 601/112 |
| 7,823,677 B2 * | 11/2010 | Minami .................... B62J 1/12 180/219 |
| 9,238,496 B2 * | 1/2016 | Tsutsumi ................ B60Q 9/00 |
| 2007/0239090 A1 * | 10/2007 | Mitea ................ A61H 15/0078 601/112 |
| 2010/0096896 A1 * | 4/2010 | Nonomiya ............... B60N 2/22 297/362 |
| 2011/0087139 A1 * | 4/2011 | Ferber ................... A61H 7/007 601/134 |

(Continued)

*Primary Examiner* — Colin W Stuart
*Assistant Examiner* — Douglas Y Sul
(74) *Attorney, Agent, or Firm* — Glenn E. Gold; Glenn E. Gold, P.A.

(57) ABSTRACT

A motorcycle seat-massage system includes a frame forming at least a front seat and a front backrest. The front backrest frame includes an upper lateral member. A first massage unit is disposed on the front backrest frame lateral member and is laterally translatable thereon. The massage unit includes an electric motor coupled to a drive unit for powered translation of the massage unit on the backrest frame lateral member and further includes a massage head having a plurality of spherical massagers affixed thereto. The massage head is rotationally coupled to the electric motor, and a flexible seat cover is fitted over the frame and the massage unit. At least one controller is electrically communicative with the massage unit, the controller is operable to selectively engage and disengage the massage unit.

12 Claims, 5 Drawing Sheets

(56) References Cited

U.S. PATENT DOCUMENTS

2013/0030336 A1* 1/2013 Chen .................. A61H 7/004
601/98

* cited by examiner

MOTORCYCLE SEAT MASSAGE SYSTEM

CROSS-REFERENCE TO RELATED APPLICATION

This U.S. non-provisional utility patent application claims the benefit of U.S. provisional patent application No. 61/920,566, filed on Dec. 24, 2013, which is incorporated by reference herein in its entirety.

FIELD OF THE INVENTION

The present disclosure generally relates to apparatuses and methods for rider comfort on a motorcycle. More particularly, the present disclosure relates to a massage device embedded in the seat of a motorcycle.

BACKGROUND OF THE INVENTION

For most people around the world, riding a motorcycle, or motorcycling, is the only affordable form of individual motorized transportation. Small displacement motorcycles are the most common motor vehicle in the most populous countries, since for most riders, a motorcycle is a cheaper and more convenient form of transportation. The use of motorcycles for transportation causes less commuter congestion within cities and has a lower environmental impact than automobile ownership. However, for others motorcycling is a leisure activity as a means to relieve stress and to clear one's mind. Motorcycles can be used for all types of travel from short commutes and extending up to multi-day long-distance trips.

The motorcycle has evolved from the integration of a small gasoline engine on a bicycle to that of a large two-wheeled motorized vehicle. The basic design concept, however, has remained relatively constant since its inception. A motorcycle generally comprises two in-line wheels mounted to a frame with the drive engine also mounted to a frame and positioned between the two wheels. The front wheel is steerable utilizing a time-honored handlebar, and a seat is mounted to an upper portion of the frame behind the handlebars. A motorcycle rider sits on the seat by straddling the frame in much the same manner as riding a bicycle. The seats incorporated on a motorcycle range from a mere elongated padded platform on small displacement cycles to those on larger cycles further incorporating partial or full backrests.

Unlike in closed motor vehicles such as automobiles and trucks where an individual is able to shift his or her seating position, a motorcycle rider must remain in a substantially fixed position straddling the motorcycle frame and maintaining a grasp on the handlebars. Consequently, an individual is often susceptible to muscular discomfort, stiffness, or cramping. This discomfort is often concentrated in the rider's back, and most particularly in the rider's lower back. Until now, a rider's primary recourse to such discomfort has been relegated to stopping, dismounting the motorcycle, and engaging in various stretching exercises, thereby interrupting the rider's travels.

Therefore, a massage system integrated with a motorcycle seat is needed whereby a motorcycle rider can selectively address and alleviate back pain and discomfort while riding the motorcycle.

SUMMARY OF THE INVENTION

The present disclosure is generally directed to a motorcycle seat massage system having a frame forming at least a front seat and a front backrest. The front backrest frame includes an upper lateral member. A first massage unit is disposed on the front backrest frame lateral member and is laterally translatable thereon. The massage unit includes an electric motor coupled to a drive unit for powered translation of the massage unit on the backrest frame lateral member and further includes a massage head having a plurality of spherical massagers affixed thereto. The massage head is rotationally coupled to the electric motor, and a flexible seat cover is fitted over the frame and the massage unit. At least one controller is electrically communicative with the massage unit, the controller is operable to selectively engage and disengage the massage unit.

In another aspect, the spherical massagers of the massage head contacts the cover.

In still another aspect, the motorcycle seat massage system further includes a control unit wherein the massage unit and the controller are electrically communicative therewith.

In yet another aspect, the control unit includes a circuit board containing operational logic for controlling the massage unit.

In a still further aspect, the upper lateral member is arched.

In another aspect, the upper lateral member is straight.

In another aspect, the frame further forms a rear seat and a rear backrest wherein the rear backrest frame includes a lower lateral member having a second massage unit substantially identical to the first massage unit disposed on the rear backrest frame lower lateral member and laterally translatable thereon.

In a still further aspect, the motorcycle seat massage system further includes a second controller electrically communicative with the second massage unit, the controller operable to selectively engage and disengage the second massage unit.

In yet another aspect, the rear backrest frame of the rear backrest further includes an upper lateral member of above the lower lateral member and also includes a third massage unit disposed on the rear backrest frame upper lateral member and is laterally translatable thereon.

In another aspect, the rear lateral members are straight.

In still another aspect, the rear lateral members are arched.

In yet another aspect, the rear lower lateral member is arched and the rear upper lateral member is straight.

In another aspect, a motorcycle seat massage system includes a frame forming a front seat and a front backrest and further forming a rear seat and a rear backrest. The front backrest frame includes an upper lateral member, and the rear backrest frame includes an upper and a lower lateral member. A first massage unit is disposed on the front backrest frame lateral member and is laterally translatable thereon. A second massage unit is disposed on the rear backrest frame lower lateral member and is laterally translatable thereon. A third massage unit is disposed on the rear backrest frame upper lateral member and is laterally translatable thereon. Each massage unit includes an electric motor coupled to a drive unit for powered translation of the massage unit on a respective backrest frame lateral member and further includes a massage head having a plurality of spherical massagers affixed thereto. The massage head is rotationally coupled to the electric motor. A flexible seat cover is fitted over the frame and the massage units. A control unit is electrically communicative with the massage units for operable control thereof and at least one controller is electrically communicative with the control unit and is operable to selectively engage and disengage massage units.

In still another aspect, the control unit includes a circuit board containing operational logic for controlling each massage unit.

In yet another aspect, the spherical massagers of each said massage head contacts the cover.

In a still further aspect, the motorcycle seat massage system includes a first controller and a second controller, each controller electrically communicative with the control unit. The first controller operably controls the first massage unit, and the second controller operably controls the second and the third massage units.

In another aspect, all of the lateral members are straight.

In another aspect, all of the lateral members are arched.

In a still further aspect, the front seat upper lateral member is arched, the rear seat lower lateral member is arched, and the rear seat upper lateral member is straight.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
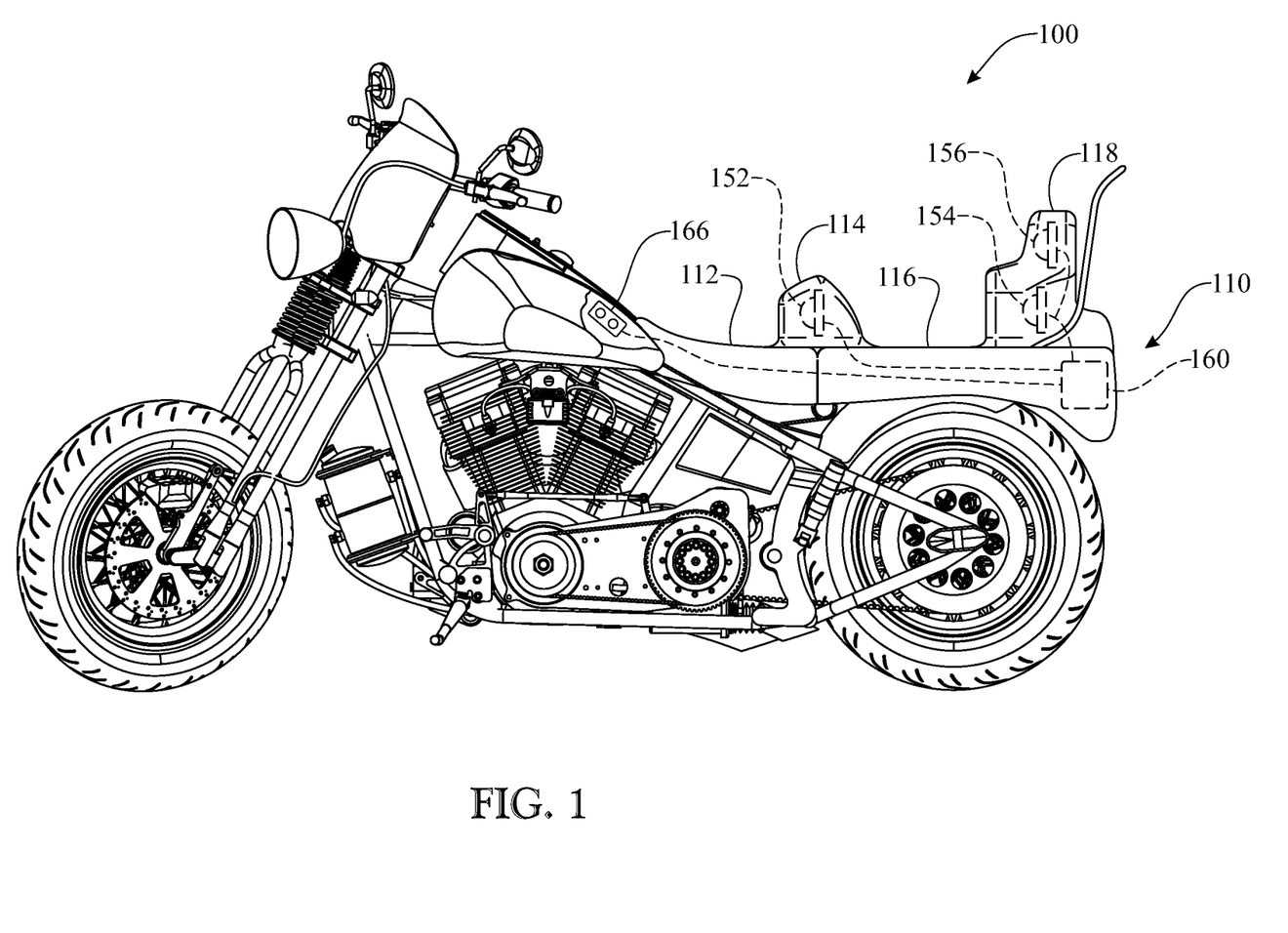
FIG. 1 presents a left side elevation view of a motorcycle having a seat embodying the present invention, wherein one or more massage units are embedded in the seat backs.

In one exemplary implementation of the invention, a motorcycle 100 is shown in FIG. 1 illustrating its various components including a dual seat 110 incorporating an integrated massage system which is one of the preferred embodiments of the present invention. The dual seat 110 has a front seat 112 with a front backrest 114 and a rear seat 116 with a rear backrest 118. The front backrest 114 incorporates a first massage unit 152 and the rear backrest 118 incorporates a second massage unit 154 and a third massage unit 156. The massage units 152, 154, 156 are electrically communicative with a master control 160. A controller 166, also electrically communicative with the master control 160, is mounted to the motorcycle 100 in a manner that is accessible to the driver of the motorcycle 100 for selectively engaging and disengaging one or more of the massage units 152, 154, 156.

As further illustrated in FIGS. 2-5, the seat assembly 110 is supported by a frame 120 in a manner well known art such that a portion of the frame 120 extends upwardly at a rear portion of front seat 112 and at a rear portion of rear seat 116 for the support of front backrest 114 and rear backrest 118 respectively. The portion of the frame 120 supporting the front backrest 114 includes a lateral member 122 on which the first massage unit 152 is operationally mounted. The portion of the frame 120 supporting the rear backrest 118 includes a lower lateral member 124 and an upper lateral member 126 on which the second and third massage units 154, 156 are operationally mounted respectively. The lateral members 122, 124, 126 can be straight or optionally arched in configuration. Most preferably, the front lateral member 122 and the lower rear lateral member 124 are arched and the rear upper lateral member 126 is straight.

Figure 2:
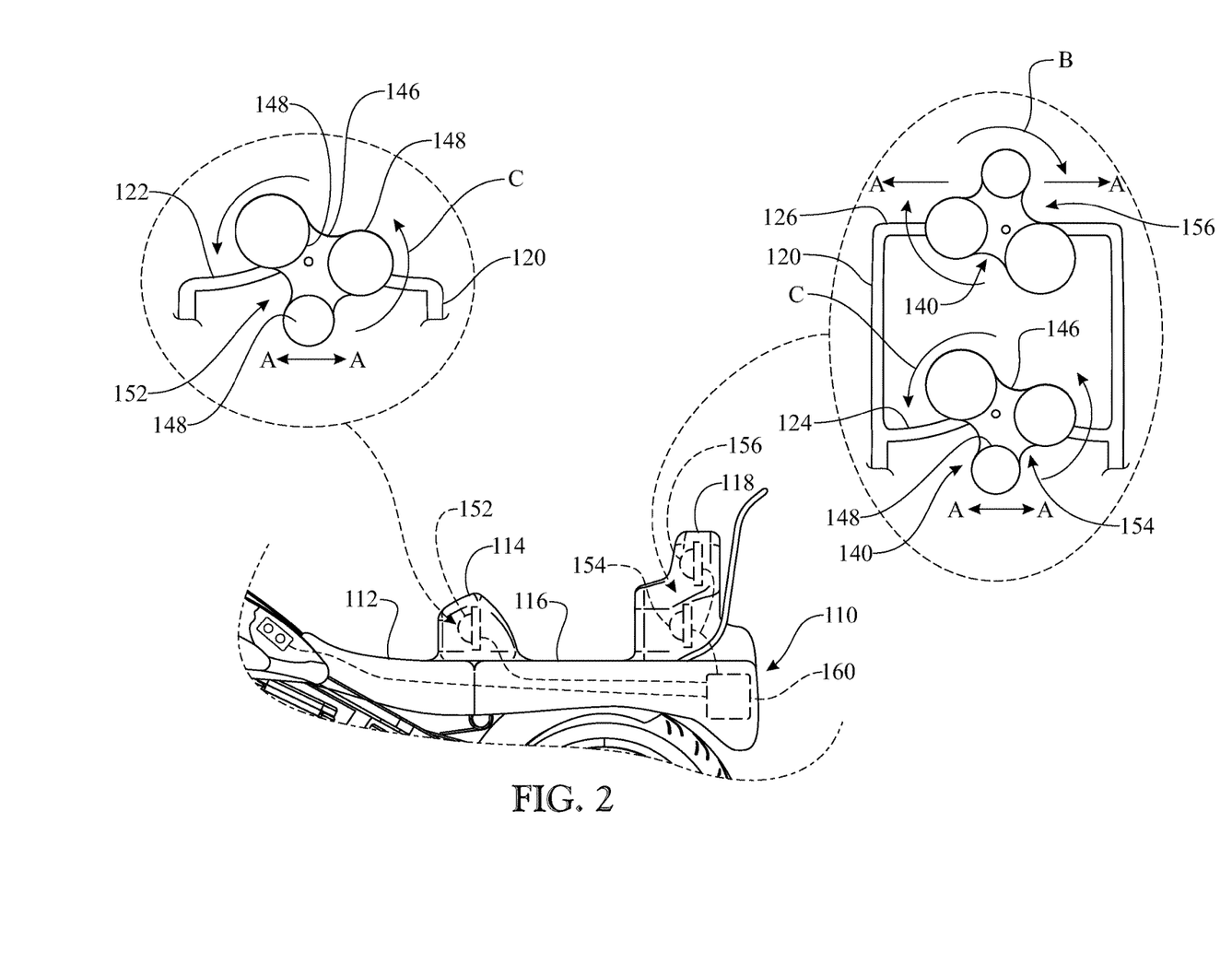
FIG. 2 presents an enlarged side elevation view of the motorcycle seat and selected segments thereof showing the massage units embedded therein.
Figure 3:
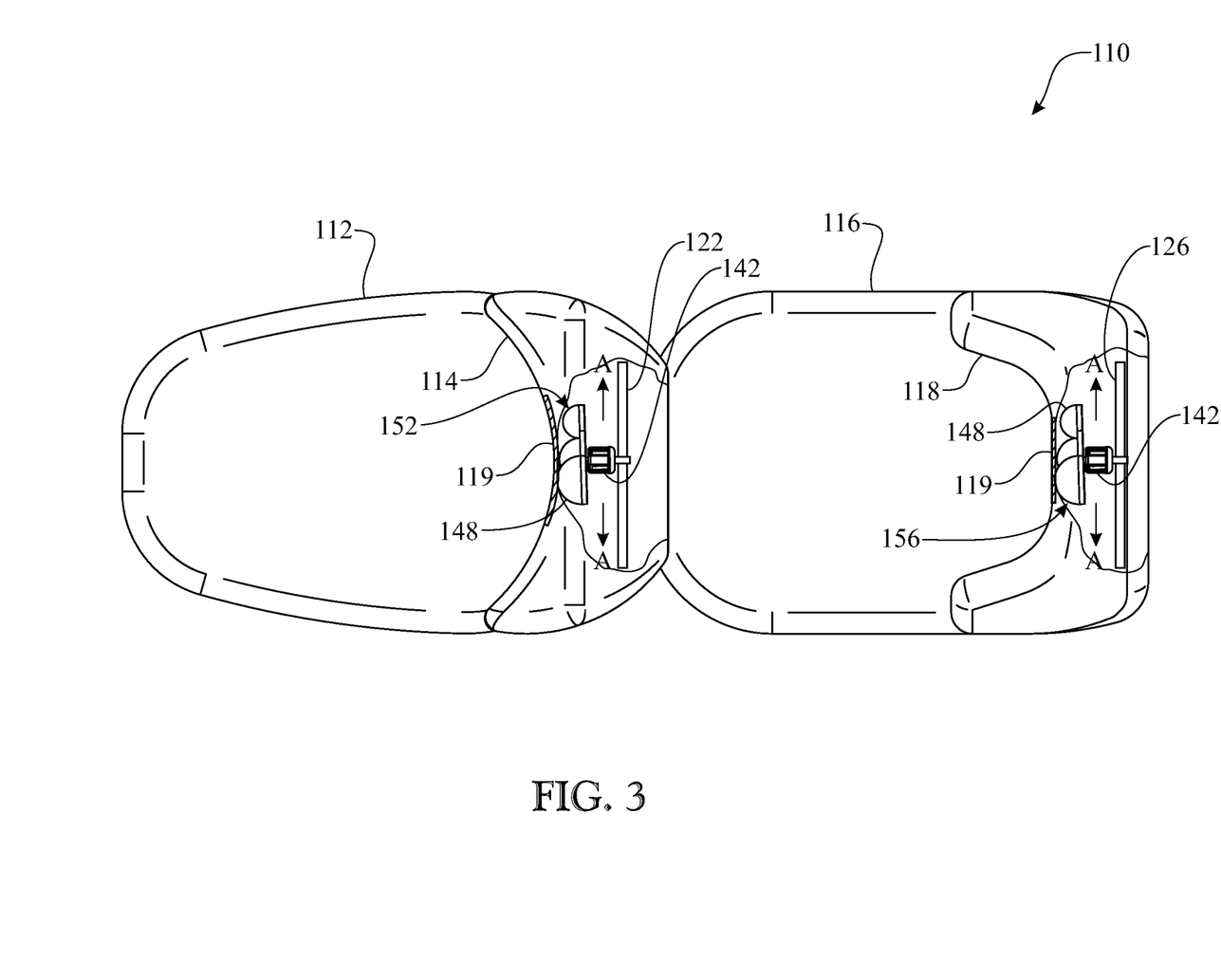
FIG. 3 presents a top plan view of the motorcycle seat and the massage units embedded therein.
Figure 4:
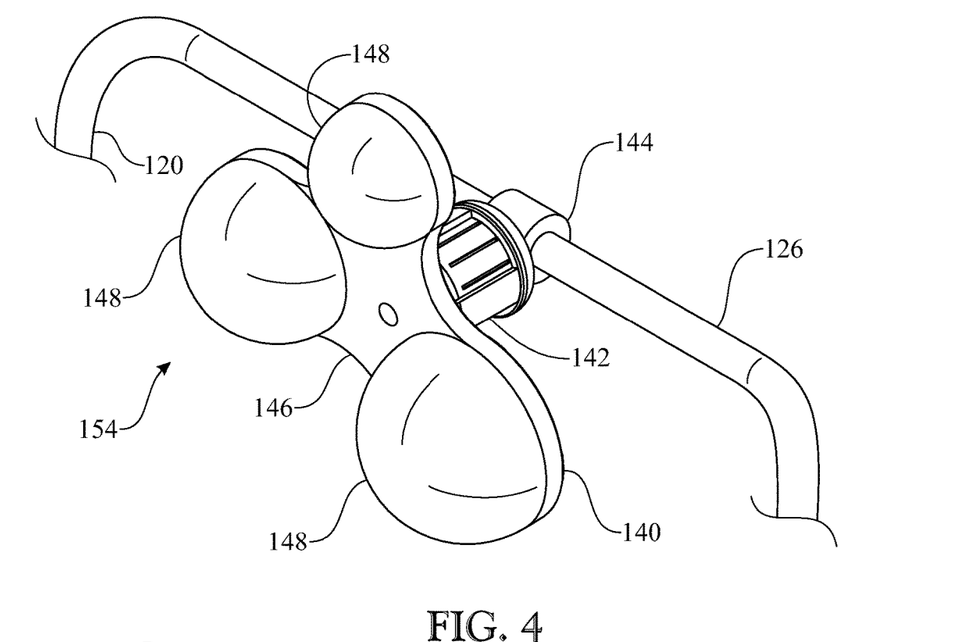
FIG. 4 presents an isometric view of a massage unit mounted on a straight crossbar.
Figure 5:
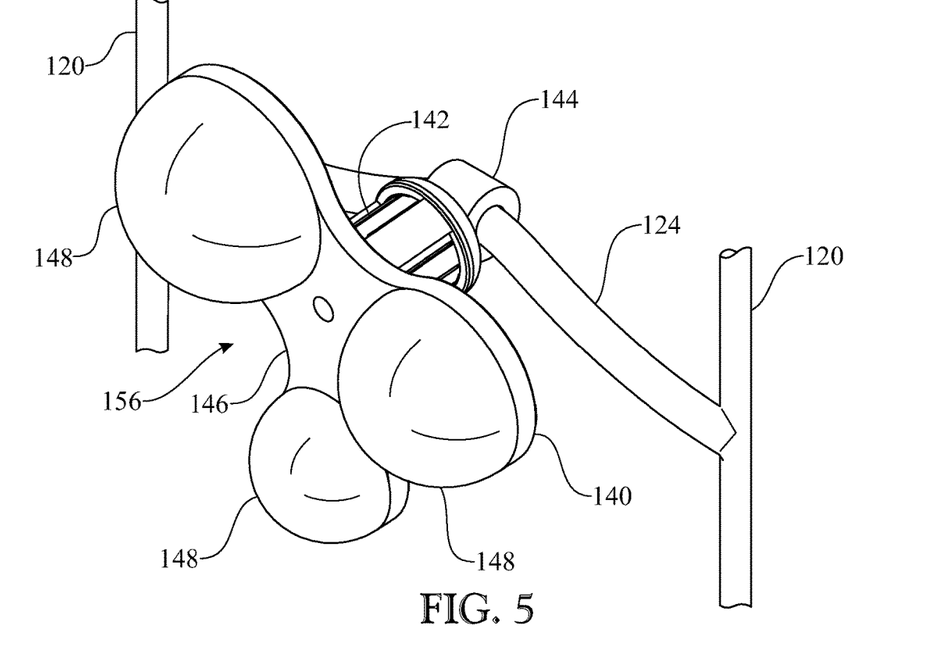
FIG. 5 presents a an isometric view of a massage unit mounted on an arched crossbar.

As most clearly illustrated in FIGS. 4 and 5 the massage units 152 (not shown), 154,156 comprise identical massage assemblies 140. Each massage assembly 140 includes a massage head 146 on which is mounted a plurality of differently sized massagers 148. Each massager 148 is spherically shaped of the same or different diameters and constructed of a material having a desired degree of resilience such as a hard rubber or other resilient man-made polymer. The massage head 146 is rotatably mounted to an electric motor 142 to which is also a affixed a linear drive mechanism 144. The linear drive mechanism 144 is operably engaged on the arched lateral member 124 as illustrated in FIG. 5 or on straight lateral member 126 as illustrated in FIG. 4. The electric motor 142 rotatably drives the massage head 146 in either a clockwise direction noted by arrows "B" or a counterclockwise direction noted by arrows "C" as illustrated in FIG. 2. The electric motor 142 also powers the linear drive mechanism 144 in a manner known in the art to translate the massage assembly 140 laterally on the lateral members 122, 124, 126 as noted by directional arrows "A" in FIGS. 2 and 3.

As illustrated in FIG. 3, front seat 112, the front backrest 114, the rear seat 116, and rear backrest 118 are covered with a seat cover 119 utilizing a weather resistant pliant material known in the art. The seats and back rests are given form by sculpted resilient cushioning (not shown) in a manner known in the art. However, the cushioning forms a void in the back rests 114, 118 to permit the massage assemblies 140 a volume in which to operate. Further, the massage units 152, 154 (not shown), 156 are positioned such that the spherical massagers 148 operably bear against the inside surface of the seat cover 119 covering the back rests 114, 118. In operation, the electric motor 144 rotates the massage head 146 such that the individual spherical massagers 148 across the inner surface of the seat cover 119 in a circular manner while the linear drive 146 translates along the lateral frame member 122, 124, 126 thereby massaging an area of the rider's back contacting the backrest 114, 118.

Figure 6:
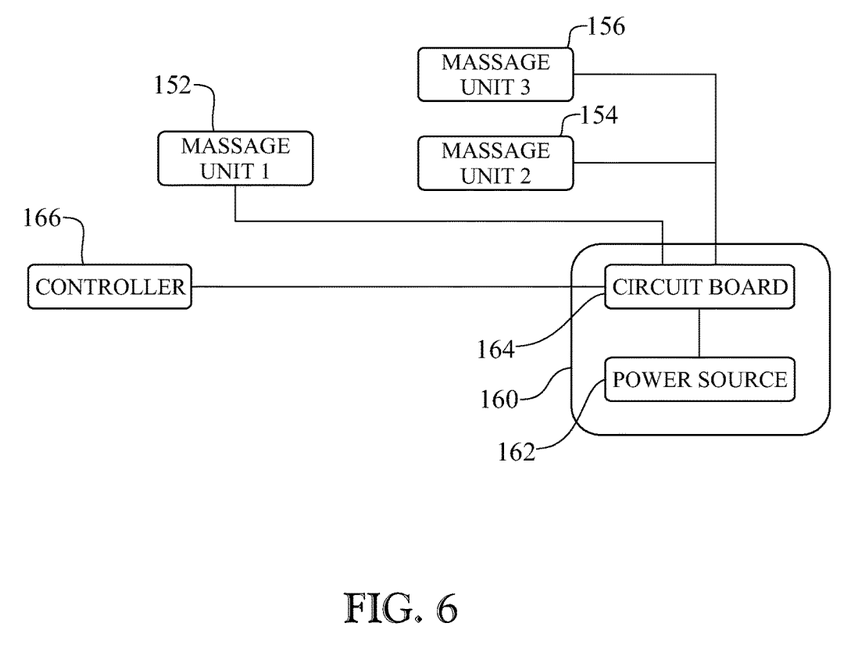
FIG. 6 presents a system block diagram of the seat massage system incorporating a single controller.

Referring now particularly to FIG. 6 a block diagram format of the system configuration of the seat massaging system is shown. A master controller, or master control, 160 includes a power source 162 and a circuit board 164, which contains the necessary operational logic for the first, second, and third massage units 152, 154, 156, and is electrically communicative with the massage units 152, 154, 156. The circuit board 164 is also electrically communicative with the controller 166. The power source 162 is most preferably a connection to the electrical power system of the motorcycle 100 in a manner known in the art.

Figure 7:
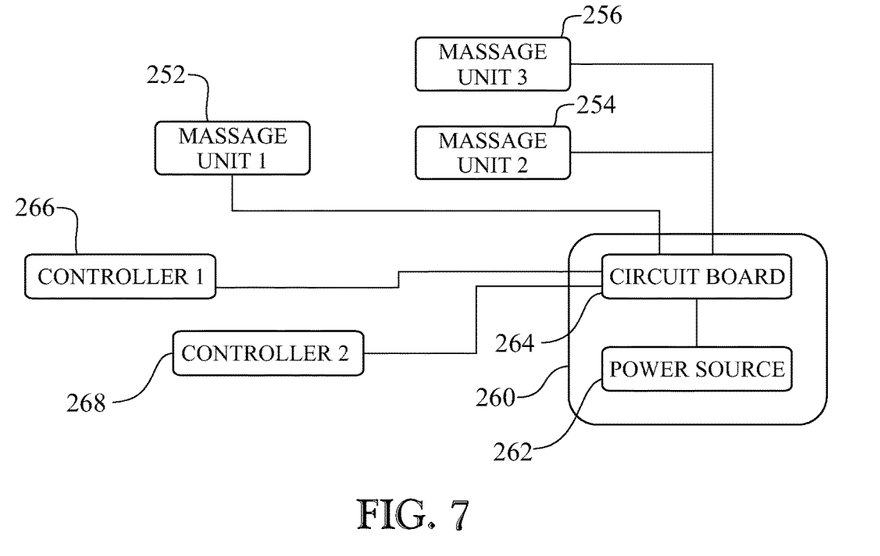
FIG. 7 presents a system block diagram of the seat massage system incorporating a controller for each of two seats.

Optionally, as illustrated in FIG. 7, the seat massaging system can include dual controllers 266, 268 which are electrically communicative with the circuit board 264 of the master control 260. In this system, the first controller 266 functions to selectively operate the first massage unit 252 in the front backrest 114 (FIG. 1) and the second controller 268 functions to selectively operate the second and third massage units 254, 256 respectively in the rear backrest 118 (FIG. 1). The power source 262 again is most preferably a connection to the electrical power system of the motorcycle 100 in a manner known in the art. In this manner, the rider sitting on the front seat 112 (FIG. 1) can utilize the first controller 266 to operate the first massage unit 252 as desired by the front rider, and similarly, a rider occupying the rear seat 116 (FIG. 1) can independently operate the second and third massage units 254, 256 utilizing the second controller 268. In this case, the first controller 266 would be located in a region of the motorcycle easily accessible to the driver, and the second controller 268 would be located in a region of the motorcycle easily accessible to the rear seat passenger (e.g., integrated directly into the rear seat).

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A motorcycle seat-massage system, comprising:
   a dual motorcycle seat having a unitary body including a front seat having a front seat backrest extending vertically upwards from a rear end thereof, and a rear seat having a rear seat backrest extending vertically upwards from a rear end thereof, at least one of said front and rear seat backrests having a resilient cushioning backrest body defining a backrest body interior void;
   a motorcycle frame including a front seat backrest body-supporting framework disposed within said front seat backrest body void and extending upwardly from a rear portion of said front seat, and a rear seat backrest body-supporting framework disposed within said rear seat backrest body void and extending upwardly from a rear portion of said rear seat, at least one of said front and rear seat backrest body-supporting frameworks including a first horizontally-oriented lateral frame member spanning a first pair of spaced-apart vertically-oriented longitudinal frame members, said first horizontally-oriented lateral frame member having an upwardly-arched curvature;
   a first massage unit operably mounted to said first horizontally-oriented lateral frame member and laterally translatable therealong by a linear drive mechanism operably engaged therewith;
   a first massage unit electric motor coupled to both said linear drive mechanism and to a first massage head of said first massage assembly for powered translation of said first massage unit along said first horizontally-oriented lateral member, said first massage head having a plurality of spherical massagers affixed thereto, said first massage head rotationally coupled to said electric motor;
   a flexible seat cover fitted over said front and rear seats, and over the respective front and rear seat resilient cushioning backrest bodies and
   a first controller electrically communicative with said first massage unit, said first controller operable to selectively engage and disengage said first massage unit.

2. The motorcycle seat-massage system according to claim 1 wherein each of said plurality of spherical massagers of said first massage head contacts an interior surface of said flexible seat cover.

3. The motorcycle seat-massage system according to claim 1 further including a master control unit electrically communicative with said first controller and said first massage unit electrically communicative therewith.

4. The motorcycle seat-massage system according to claim 3 wherein said master control unit further comprises a circuit board containing operational logic for controlling said first massage unit.

5. The motorcycle seat-massage system according to claim 1 wherein said rear seat backrest body-supporting framework further comprises a second horizontally-oriented lateral frame member spanning said first pair of spaced-apart vertically-oriented longitudinal frame members, said second lateral member being linear.

6. The motorcycle seat-massage system according to claim 1, wherein said at least one of said front and rear seat backrest body-supporting frameworks further comprises:
   a second horizontally-oriented lateral frame member spanning a second pair of spaced apart vertically-oriented longitudinal frame members; and
   a second massage unit disposed on said second horizontally-oriented lateral frame member and laterally translatable thereon.

7. The motorcycle seat-massage system according to claim 5 wherein said rear seat backrest body-supporting framework further comprises:
   a second massage unit disposed on said second horizontally-oriented lateral frame member and laterally translatable thereon.

8. A motorcycle seat-massage system, comprising:
   a frame forming a front seat and a front backrest extending upwardly from said front seat and further forming a rear seat and a rear backrest extending upwardly from said rear seat, said front backrest frame including an upper lateral member and said rear backrest frame including an upper and a lower lateral member, at least one of said front backrest frame upper lateral member, and said rear backrest frame lower lateral member having an upwardly-arched curvature;

a first massage unit disposed on said front backrest frame lateral member and laterally translatable thereon;

a second massage unit disposed on said rear backrest frame lower lateral member and laterally translatable thereon;

a third massage unit disposed on said rear backrest frame upper lateral member and laterally translatable thereon;

each of said massage units including an electric motor coupled to a drive unit for powered translation of said massage unit on a respective backrest frame lateral member and further including a massage head having a plurality of spherical massagers affixed thereto, said massage head rotationally coupled to said electric motor;

a flexible seat cover fitted over said frame and each of said massage units;

a control unit electrically communicative with each of said massage units for operable control thereof; and at least one controller electrically communicative with said control unit, said controller operable to selectively engage and disengage each of said massage units.

9. The motorcycle seat-massage-system according to claim 8 wherein said control unit includes a circuit board containing operational logic for controlling each said massage unit.

10. The motorcycle seat-massage system according to claim 8 wherein said spherical massagers of each said massage head contacts said cover.

11. The motorcycle seat-massage system according to claim 8 including a first controller and a second controller, each said controller electrically communicative with said control unit and further wherein said first controller operably controls said first massage unit and wherein said second controller operably controls said second and said third massage units.

12. The motorcycle seat-massage system according to claim 8 wherein said front backrest frame upper lateral member is arched, said rear backrest frame lower lateral member is arched, and said rear backrest frame upper lateral member is straight.

* * * * *